(12) United States Patent
Lewis et al.

(10) Patent No.: US 11,130,418 B2
(45) Date of Patent: Sep. 28, 2021

(54) METHOD AND APPARATUS FOR ALIGNING A VEHICLE WITH A WIRELESS CHARGING SYSTEM

(71) Applicant: GM GLOBAL TECHNOLOGY OPERATIONS LLC, Detroit, MI (US)

(72) Inventors: Allan K. Lewis, Windsor (CA); Apral S. Hara, Lasalle (CA); Mohammad Naserian, Windsor (CA)

(73) Assignee: GM GLOBAL TECHNOLOGY OPERATIONS, LLC, Detroit, MI (US)

( * ) Notice: Subject to any disclaimer, the term of this patent is extended or adjusted under 35 U.S.C. 154(b) by 225 days.

(21) Appl. No.: 16/449,627

(22) Filed: Jun. 24, 2019

(65) Prior Publication Data

US 2020/0398689 A1  Dec. 24, 2020

(51) Int. Cl.
| | |
|---|---|
| *H02J 50/90* | (2016.01) |
| *H02J 50/80* | (2016.01) |
| *B60L 53/36* | (2019.01) |
| *B60L 53/12* | (2019.01) |
| *G06K 9/00* | (2006.01) |

(52) U.S. Cl.
CPC ............... *B60L 53/36* (2019.02); *B60L 53/12* (2019.02); *G06K 9/00671* (2013.01); *H02J 50/80* (2016.02); *H02J 50/90* (2016.02)

(58) Field of Classification Search
USPC ........................................................ 320/109
See application file for complete search history.

(56) References Cited

U.S. PATENT DOCUMENTS

| | | | |
|---|---|---|---|
| 2012/0286730 A1* | 11/2012 | Bonny ................... | B60L 53/35 |
| | | | 320/109 |
| 2018/0134163 A1* | 5/2018 | Kuribara ................. | B60L 53/38 |
| 2019/0160971 A1* | 5/2019 | Fukushima ............ | B60L 53/12 |

* cited by examiner

*Primary Examiner* — Bryce M Aisaka
(74) *Attorney, Agent, or Firm* — Lorenz & Kopf LLP (57) ABSTRACT

A system and method for generating an augmented navigational image for aligning a vehicle to a wireless charging pad includes capturing a first image in a forward longitudinal direction detecting a right parking space line and a left parking space line determining first distance between a wireless charging pad and the right parking space line and a second distance between the wireless charging pad and the left parking space line, generating an augmented navigational image in response to the first image and the second image wherein the augmented navigational image further includes a right longitudinal guidance line indicative of the first distance between a vehicle longitudinal axis and the right parking space line and a left longitudinal guidance line indicative of the second distance between the vehicle longitudinal axis and displaying the augmented navigational image on a vehicle navigation display.

20 Claims, 5 Drawing Sheets

METHOD AND APPARATUS FOR ALIGNING A VEHICLE WITH A WIRELESS CHARGING SYSTEM

INTRODUCTION

The present disclosure relates generally to a system for aligning a vehicle with a wireless charging system. More specifically, aspects of the present disclosure relate to systems, methods and devices for generating and displaying an image overlay to provide augmented guidance lines aligned to parking space lines within an image.

As electric vehicles become more prevalent, increased resources are required for charging these vehicles. Currently most personal electric vehicles are charged in the home thereby practically reducing the total daily range of the vehicle to approximately one full charge per day. Remote charging stations are becoming more and more available, thereby increasing the practicality of electric vehicles by increasing the useable range. To win broad market acceptance, electric vehicles must have access to quick and easy charging facilities in locations close to the driver's destination.

Electric vehicle charging stations are usually either 120 volts or 240 volts and require the vehicle operator to plug in the vehicle to be charged. If the vehicle will only be parked for a short period of time, the driver may forego the inconvenience of plugging in the vehicle, thereby missing out on potential vehicle charging time. To overcome this inconvenience, wireless charging stations are being developed which wirelessly couple an electric charge to a charge receiver on the vehicle. However, the vehicle must be accurately aligned with the charger to enable effective charging, which can be difficult, especially if the charger and charge receiver are located under the vehicle. It would be desirable to provide better alignment of a vehicle with a wireless charger in order to overcome the aforementioned problems.

The above information disclosed in this background section is only for enhancement of understanding of the background of the invention and therefore it may contain information that does not form the prior art that is already known to a person of ordinary skill in the art.

SUMMARY

Disclosed herein are human machine interface methods and systems and related control logic for provisioning computational systems, methods for making and methods for operating such systems, and motor vehicles equipped with onboard control systems. By way of example, and not limitation, there is presented various embodiments of display and configuration of a user interface in a motor vehicle, and a method for display of charger alignment on a display for a motor vehicle are disclosed herein.

In accordance with an aspect of the present invention an apparatus for generating an augmented navigational image for aligning a vehicle to a wireless charging pad having a camera operative for capturing a first image in a forward longitudinal direction and a second image, a processor operative for detecting the wireless charging pad, a right parking space line and a left parking space line in response to the first image, determining first distance between the wireless charging pad and the right parking space line and a second distance between the wireless charging pad and the left parking space line, generating the augmented navigational image in response to the first image and the second image wherein the augmented navigational image further includes a right longitudinal guidance line indicative of the first distance between a vehicle longitudinal axis and the right parking space line and a left longitudinal guidance line indicative of the second distance between the vehicle longitudinal axis and the left parking space line such that when the vehicle longitudinal axis is aligned with the wireless charging pad, the right longitudinal guidance line is overlaid on the right parking space line and the left longitudinal guidance line is overlaid on the left parking space line, and a display within a vehicle cabin operative for displaying the augmented navigational image.

In accordance with another aspect of the present invention wherein the augmented navigational image includes a top down view perspective.

In accordance with another aspect of the present invention wherein the display is operative to display the first image and the augmented navigational image.

In accordance with another aspect of the present invention wherein the augmented navigational image further includes a charging pad indicator indicative of the location of the wireless charging pad.

In accordance with another aspect of the present invention wherein the augmented navigational image further includes a charging pad indicator indicative of the location of the wireless charging pad and a charge coupler indicative of a location of a wireless charge coupler on the vehicle.

In accordance with another aspect of the present invention wherein the processor is operative for detecting the wireless charging pad in response to a vehicle speed being less than a threshold speed.

In accordance with another aspect of the present invention wherein the processor is operative for detecting the wireless charging pad in response to a vehicle location being proximate to a wireless charging station location.

In accordance with another aspect of the present invention wherein the processor is operative for detecting the wireless charging pad in response to a vehicle location being proximate to a wireless charging station location wherein the wireless charging station location is provided in response to a map data stored in a memory in the vehicle.

In accordance with another aspect of the present invention a method for generating an augmented navigational image for aligning a vehicle to a wireless charging pad having capturing a first image in a forward longitudinal direction and a second image in a rearward longitudinal direction, detecting a wireless charging pad, a right parking space line and a left parking space line in response to the first image, determining first distance between the wireless charging pad and the right parking space line and a second distance between the wireless charging pad and the left parking space line, generating an augmented navigational image in response to the first image and the second image wherein the augmented navigational image further includes a right longitudinal guidance line indicative of the first distance between a vehicle longitudinal axis and the right parking space line and a left longitudinal guidance line indicative of the second distance between the vehicle longitudinal axis and the left parking space line such that when the vehicle longitudinal axis is aligned with the wireless charging pad, the right longitudinal guidance line is overlaid on the right parking space line and the left longitudinal guidance line is overlaid on the left parking space line, and displaying the augmented navigational image on a vehicle navigation display.

In accordance with another aspect of the present invention wherein the augmented navigational image includes a top down view perspective.

In accordance with another aspect of the present invention wherein the display is operative to display the first image and the augmented navigational image.

In accordance with another aspect of the present invention wherein the augmented navigational image further includes a charging pad indicator indicative of the location of the wireless charging pad.

In accordance with another aspect of the present invention wherein the augmented navigational image further includes a charging pad indicator indicative of the location of the wireless charging pad and a charge coupler indicative of a location of a wireless charge coupler on the vehicle.

In accordance with another aspect of the present invention further operative for detecting the wireless charging pad in response to a vehicle speed being less than a threshold speed.

In accordance with another aspect of the present invention further operative for detecting the wireless charging pad in response to a vehicle location being proximate to a wireless charging station location wherein the wireless charging station location is provided in response to a map data stored in a memory in the vehicle.

In accordance with another aspect of the present invention an apparatus having a display for displaying a first augmented image and a second augmented image, and a first camera operative to capture a first image of a first field of view, a second camera operative to capture a second image of a second field of view, a processor operative for detecting a wireless charging pad, a right parking space line and a left parking space line in response to the first image, determining a first distance between the wireless charging pad and the right parking space line and a second distance between the wireless charging pad and the left parking space line, for generating an augmented navigational image in response to the first image and the second image wherein the augmented navigational image further includes a right longitudinal guidance line indicative of the first distance between a vehicle longitudinal axis and the right parking space line and a left longitudinal guidance line indicative of the second distance between the vehicle longitudinal axis and the left parking space line such that when the vehicle longitudinal axis is aligned with the wireless charging pad, the right longitudinal guidance line is overlaid on the right parking space line and the left longitudinal guidance line is overlaid on the left parking space line, and a display operative to displaying the augmented navigational image.

In accordance with another aspect of the present invention wherein the augmented navigational image is a top down view image.

In accordance with another aspect of the present invention wherein the processor is further operative to generate an augmented front view image in response to the first image wherein the augmented front view image includes the left longitudinal guidance line and the right longitudinal guidance line rendered from a front view perspective.

In accordance with another aspect of the present invention wherein the display is further operative to display the augmented front view image.

In accordance with another aspect of the present invention wherein the processor is further operative for detecting the wireless charging pad in response to a vehicle location being proximate to a wireless charging station location and wherein the wireless charging station location is provided in response to a map data received via a wireless transmission.

The above advantage and other advantages and features of the present disclosure will be apparent from the following detailed description of the preferred embodiments when taken in connection with the accompanying drawings.

BRIEF DESCRIPTION OF THE DRAWINGS

The exemplary embodiments will hereinafter be described in conjunction with the following drawing figures, wherein like numerals denote like elements, and wherein.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module may refer to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
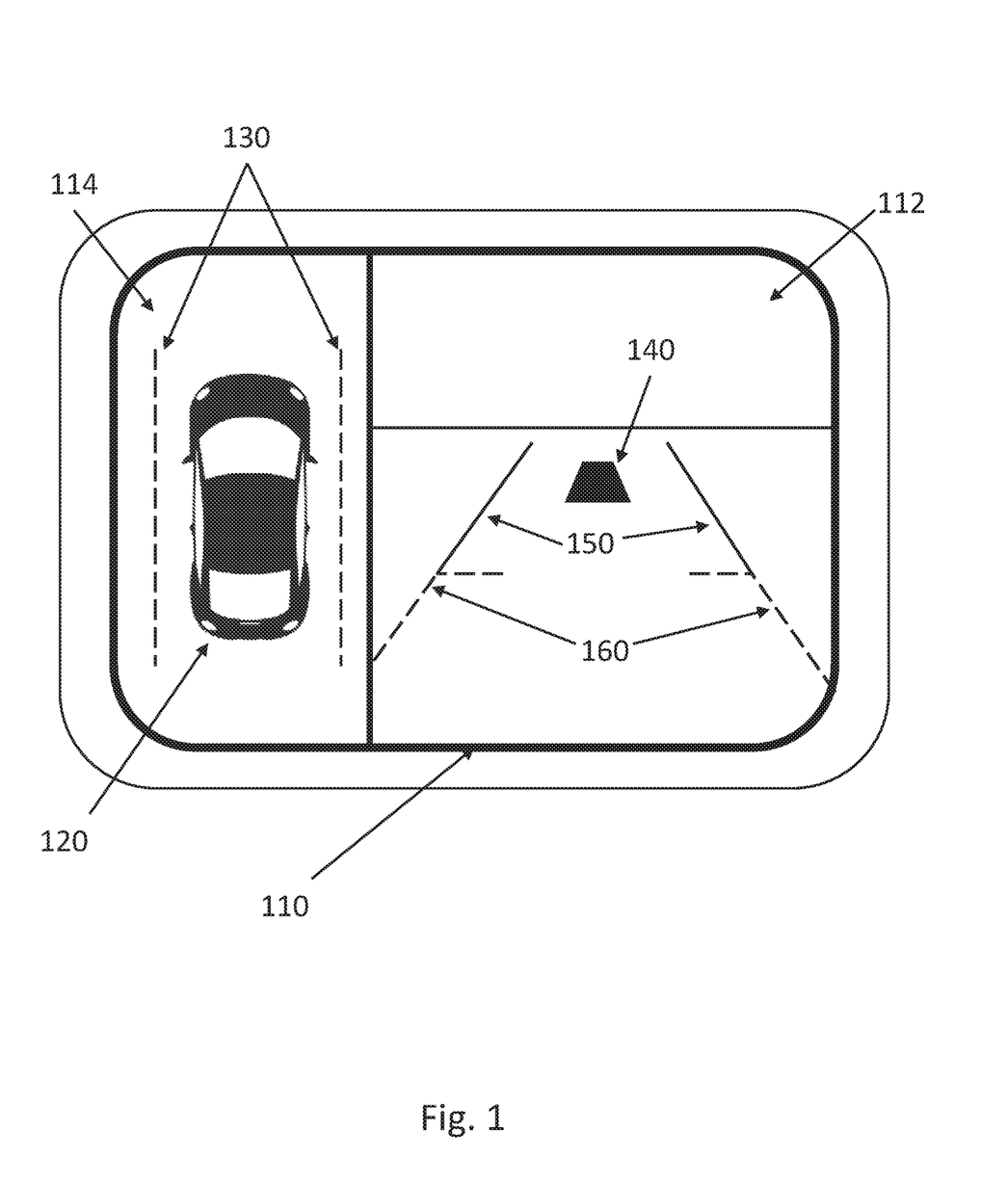
FIG. 1 shows an application for the method and apparatus for aligning a vehicle with a wireless charging system according to an exemplary embodiment of the present disclosure.

Turning now to FIG. 1, an environment for a system 100 for aligning a vehicle with a wireless charging system according to an exemplary embodiment of the present disclosure is shown. The exemplary environment 100 is illustrated on a display 110 commonly mounted in a vehicle center stack or dashboard within the vehicle cabin. The display 110 in this exemplary embodiment is operative to show both a top down 360 view 114 on one portion of the display 110 and a longitudinal view 112 on a second portion of the display 110.

According to an exemplary embodiment, the currently disclosed system and method are operative to optically detect the width of the parking space lines 150 as well as the charging pad 140 and adjusts the side overlay guidance lines 130 displayed in top down 360 view 114 and overlays augmented guidance lines 160 connecting perpendicularly to the parking space lines in the longitudinal view 112.

To allow for comprehensive low-cost wireless charging alignment for a vehicle, the exemplary system and method are operative to use vehicle cameras, video processor, and display to detect wireless charging capable parking space lines to adjust a lateral guidance line 130 overlaid on the 360 view 114 to provide the driver with lateral guidance. This method will also detect the charging pad 140 and augment longitudinal guidance lines 160 in the same color, or different color, as the painted lines on the 360 view 114. In response to the augmented display, the driver may then maneuver the vehicle in a manner that places the lateral guidance line 130 over the parking space parallel lines displayed in the 360 view 114. For longitudinal guidance the system and method may perpendicular augmented guidance lines 160 on the same plain as the painted parking space lines 150 to act as a longitudinal target for the driver.

Figure 2:
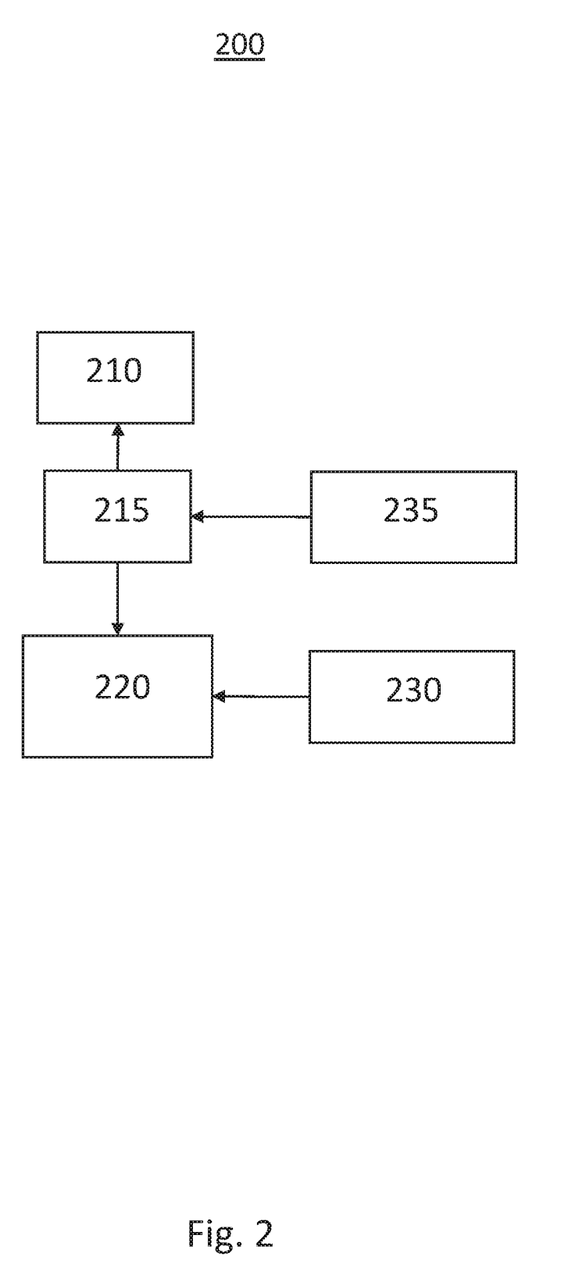
FIG. 2 shows a block diagram illustrating a system for aligning a vehicle with a wireless charging system according to an exemplary embodiment of the present disclosure.

Turning now to FIG. 2, a block diagram of an exemplary system for aligning a vehicle with a wireless charging system 200 according to an exemplary embodiment of the present disclosure is shown. The system 200 includes a display 210, a processor 215, a camera 235, a wireless charger 230 and a controller 220.

The camera 235 may be one or more optical sensors used to capture an image of a field of view (FOV). The FOV may be forward, rearward, and to the left or right of the vehicle. In an exemplary application, the camera 235 may have a forward facing FOV and may be mounted within the vehicle cabin behind the rear view mirror, may be mounted on the front facia of the vehicle, or in one or more side mirrors such that the camera 235 maintains a forward FOV. Alternatively, one or more cameras 235 may be mounted on the corners of the vehicle such that each camera 235 has a field of view encompassing a portion of a longitudinal FOV and a portion of a latitudinal FOV. The FOV of each of the plurality of cameras 235 may overlap such that images captured from each of the plurality of cameras 235 may be combined to generate a continuous panoramic view around the vehicle. This continuous panoramic view may be used to generate a virtual top down view from above the vehicle. After capturing an image, the camera 235 is operative to couple the image to the processor 215 for further processing according to the presently disclosed system.

The controller 220 is operative to control the vehicle functions, such as braking, steering and throttle, in response to a user input or control signals generated by advanced driving assistance system (ADAS) algorithm. The controller 220 may be further operative to monitor vehicle functions, such as speed, pitch, yaw, acceleration, etc. In this exemplary embodiment, the controller 220 is operative to determine a vehicle speed and to couple this vehicle speed to the processor 215.

The processor 215 is operative to receive one or more images from the camera 235. In an exemplary embodiment wherein the display 210 is operative to display both a top down view and a forward longitudinal view, the processor 215 is operative to receive a plurality of images from a plurality of cameras 235 and to process the plurality of images to generate a forward longitudinal view and a top down view for coupling to the display 210.

According to an exemplary embodiment of the currently disclosed system, the processor 215 is further operative to first receive a vehicle speed from the controller 220. The processor 215 then compares this vehicle speed to a calibration threshold. If the vehicle speed is less than the calibration threshold, indicating that the vehicle is traveling slowly which may be indicative of a parking maneuver. The processor 215 is further operative to process the image from the camera 235 to detect any parallel lines indicative of a parking space. The processor 215 is further operative to detect the wireless charging coil within the parking space. The processor 215 may be operative to determine the relative location of the wireless charging coil with respect to the parallel lines or a parking barrier.

The processor 215 may be further operative to render longitudinal guidance lines overlaid in part with the detected parallel lines. These longitudinal guidance lines may be rendered on the forward facing image to generate a forward facing augmented image as an extension of the parallel parking lines such that it provides a reference for the vehicle driver. The forward facing augmented image may then be coupled to the display 210 for display on at least a portion of the display screen. The processor 215 is further operative to project the longitudinal guidance lines onto an image depicting the top down view around the vehicle to generate an augmented top down view. In an exemplary embodiment, these longitudinal guidance lines are parallel to the longitudinal centerline of the vehicle and are spaced equal to the distance to each of the parallel parking lines such that when the vehicle is centered in the wireless charging coil, the longitudinal guidance lines overlap the parallel parking lines. This augmented top down view is then coupled to the display 210 and displayed on at least a portion of the display screen to be used as a reference to the driver.

Figure 3:
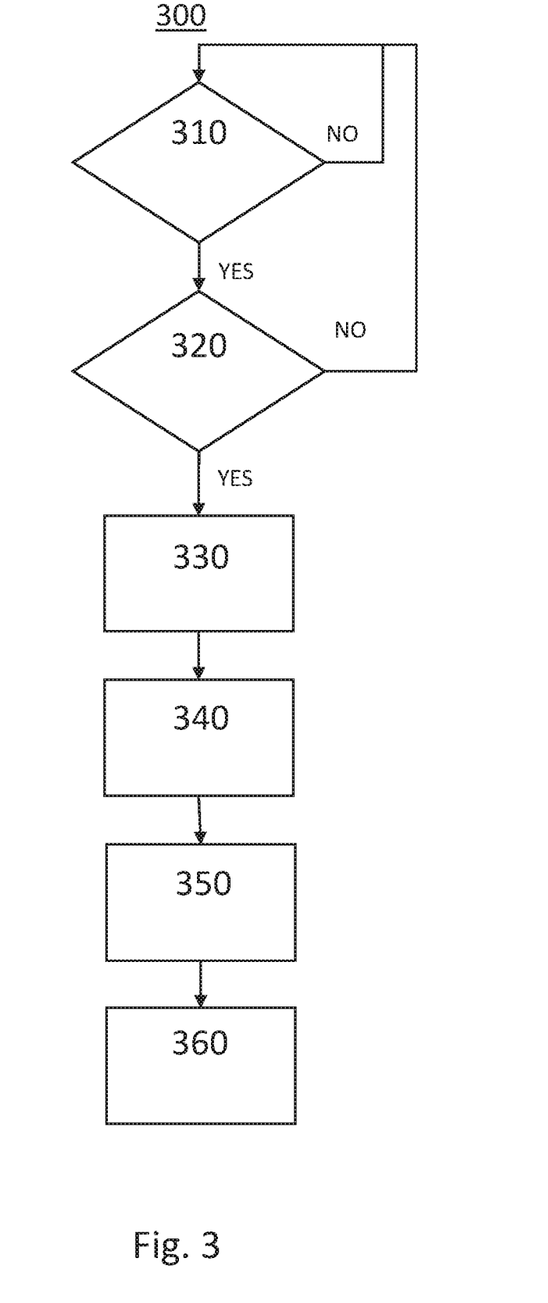
FIG. 3 shows a flow chart illustrating a method for aligning a vehicle with a wireless charging system according to an exemplary embodiment of the present disclosure.

Turning now to FIG. 3, a flow chart illustrating an exemplary method for aligning a vehicle with a wireless charging system 300 according to an exemplary embodiment of the present disclosure is shown. The method is operative to provide a visual confirmation of alignment to the vehicle driver in aligning the electric vehicle with the wireless charging coil within a wireless charging capable parking space.

In this exemplary embodiment the method is first operative to determine 310 that a vehicle speed is less than a threshold speed, such as five miles per hour. The vehicle speed may be determined in response to a global positioning system signal, or a signal from a vehicle controller or the like. The threshold speed is chosen as a speed indicative of a driver performing a parking maneuver, such as pulling in to a parking spot. In another exemplary embodiment, the vehicle speed for may be detected in response to a determination that the vehicle is proximate to a wireless charging station. The distance to the wireless charging station may be determined in response to a global positioning system signal and map data stored in a vehicle memory or received via a wireless network.

If the vehicle speed is less than a threshold speed, which may be indicative of a parking maneuver, the method is then operative to detect 320 a wireless charging location. The wireless charging location may be detected in response to a location provided by a global positioning system and map data indicative of known wireless charging locations. The map data may be stored on a memory within the vehicle or may be received via a wireless network or both. Alternatively, the wireless charging location may be detected in response to an image captured by a vehicle camera. An image processor within the vehicle control system may be operative to detect an indicator of a wireless charging station in response to an image processing algorithm. The indicator of a wireless charging station may be a vertical sign at the near the parking space, a painted indicator on the horizontal surface of the parking space, or other visual indicator. Alternatively, the wireless charging station location may be determined in response to a wireless beacon transmitted by the wireless charging station or a transponder within the wireless charging station operative to respond to a signal transmitted from the vehicle.

If the wireless charging location is detected, the method is then operative to detect 330 the parallel lines of the wireless charging capable parking space. The parallel lines may be detected in response to an image processing function performed on an image captured by a vehicle camera. The method is then operative to determine a relative location and orientation of the parallel lines with respect the vehicle. The method is then operative to detect 340 the wireless charging primary coil with respect to the parallel lines and the vehicle. This detection may be made in response to an image processing algorithm or in response to a signal from the wireless charging primary coil. In an additional exemplary embodiment, if the wireless charging primary coil is not placed at the lateral center of the parking location, the vehicle may upload this data to the cloud for future usage by other vehicles.

After determining the location of the parallel parking lines and the wireless charging primary coil, the method is then operative to render 350 longitudinal guidance lines on the virtual ground plan. The longitudinal guidance lines are generated such that they extend from the painted parking lines when presented in a forward longitudinal view. Additional longitudinal guidance lines are generated to be parallel with the longitudinal, or front to back, axis of the vehicle and spaced at distance equal to the distance between the center of the primary charging coil and the painted parking line. Thus, when presented in an augmented top down view shown on the vehicle display, the driver may position the vehicle such that the longitudinal guidance lines overlap the painted parking lines. This positioning results in the longitudinal axis of the vehicle being aligned with the center of the primary charging coil.

After rendering an augmented view for display of at least one of a top down view and a forward facing longitudinal view with the longitudinal guidance lines displayed, the method is then operative to attempt to communicate 360 to the wireless charging primary coil to trigger a confirmation electromagnetic ping. The communication is made to confirm vehicle alignment with the wireless charging pad and to indicate a wireless charging connection. The communications may be made by the vehicle transmitting electromagnetic pulses and attempting to receive a response from the wireless charging coil. In an exemplary embodiment, the response may be indicative of a coupling or connection quality. This connection quality indication may facilitate the driver adjusting to vehicle position to achieve a better charging connection. If alignment is not achieved between the vehicle and the wireless charging coil, the system may be operative to indicate to the driver to a location that will allow the vehicle sensors an opportunity to reevaluate the location of the parking lines and charger location.

In an alternative embodiment, an augmented image presenting a top down 360 view around the vehicle may be generated for display in on the vehicle display. The augmented image may be indicative of a location of the wireless charging coil and a location of a vehicle charge coupler. These rendered indicators may further facilitate the driver positioning the vehicle to maximize a charger coupling efficiency.

Figure 4:
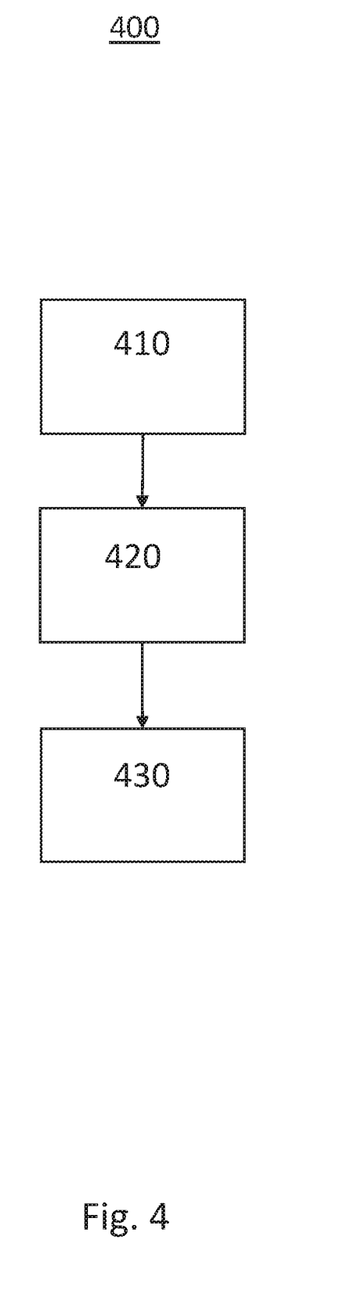
FIG. 4 shows a block diagram illustrating a system for aligning a vehicle with a wireless charging system according to another exemplary embodiment of the present disclosure.

Turning now to FIG. 4, a block diagram of a system for aligning a vehicle with a wireless charging system 400 according to an exemplary embodiment of the present disclosure is shown. The system 400 is operative for generating an augmented navigational image for aligning a vehicle to a wireless charging pad and includes a camera 410, a processor 420 and a display 430.

The camera 410 may be one or more cameras, either fixed or movable, operative for capturing a first image in a forward longitudinal direction and a second image in another direction. The first and second images may be combinable to generate a panoramic image and may be combined with additional images to generate a 360 degree view and/or a top down or birds eye view of the vehicle. The generated images may include augmentation such as a virtual vehicle, navigational lines, etc. The camera 410 is operative to couple the first and second images to the processor 420. In an exemplary embodiment, the first image is captured a forward longitudinal direction as the vehicle is approaching a wireless charging station parking space. The first image may include within the image a wireless charging pad indicator, a left parking space line, a right parking space line, and an indicator of the wireless charging station, such as a sign.

The processor 420 is operative for detecting the wireless charging pad, a right parking space line and a left parking space line in response to the first image and determining first distance between the wireless charging pad and the right parking space line and a second distance between the wireless charging pad and the left parking space line. The processor 420 is further operative for generating the augmented navigational image in response to the first image and the second image wherein the augmented navigational image further includes a right longitudinal guidance line indicative of the first distance between a vehicle longitudinal axis and the right parking space line and a left longitudinal guidance line indicative of the second distance between the vehicle longitudinal axis and the left parking space line such that when the vehicle longitudinal axis is aligned with the wireless charging pad, the right longitudinal guidance line is overlaid on the right parking space line and the left longitudinal guidance line is overlaid on the left parking space line. The processor 420 is then operative to couple the augmented navigational image to a display 430 within the vehicle for display to a driver or vehicle operator.

In additional exemplary embodiments, the processor 420 may be operative for detecting the wireless charging pad in response to a vehicle speed being less than a threshold speed. The processor 420 may also be operative for detecting the wireless charging pad in response to a vehicle location being proximate to a wireless charging station location wherein the wireless charging station location is provided in response to a map data stored in a memory in the vehicle.

The display 430 is located within a vehicle cabin, typically in a dashboard center stack or the like and is operative for displaying the augmented navigational image from the processor 420. In an exemplary embodiment, the augmented navigational image includes a top down view perspective. In an additional exemplary embodiment, the display 430 is operative to display the first image and the augmented navigational image. The augmented navigational image may include includes a charging pad indicator indicative of the location of the wireless charging pad and/or a charge coupler indicative of a location of a wireless charge coupler on the vehicle.

Figure 5:
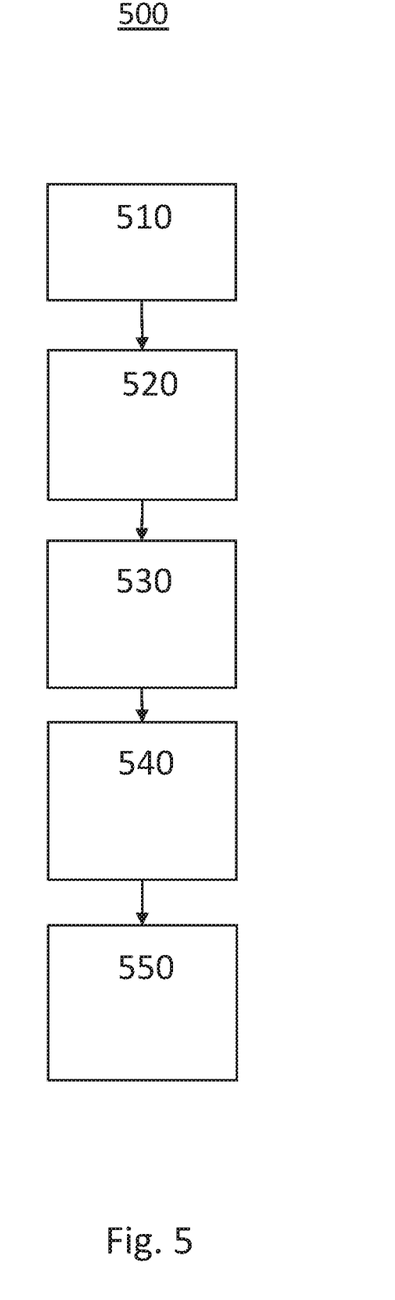
FIG. 5 shows a flow chart illustrating a method aligning a vehicle with a wireless charging system according to another exemplary embodiment of the present disclosure.

Turning now to FIG. 5, a flow chart illustrating another exemplary method for aligning a vehicle with a wireless charging system 500 according to an exemplary embodiment of the present disclosure is shown. The method 500 is operative for generating an augmented navigational image for aligning a vehicle to a wireless charging pad. The augmented navigational image may be a forward facing image or a top down or birds eye image having rendered navigational indicators, such as navigational guides, charger location indicators and charge coupler locations. The method is first operative to capture 510 a first image in a forward longitudinal direction and a second image in a rearward longitudinal direction. The images may be captured by one or more cameras. Additional images, such as a left facing and right facing images, maybe captured and used to generate a panoramic or virtual perspective view, such as a birds eye view.

The method is next operative to detect 520 a wireless charging pad, a right parking space line and a left parking space line in response to the first image. This detection may be made using image processing techniques for detecting the pad and lines within the image.

The method is next operative to determine 530 first distance between the wireless charging pad and the right parking space line and a second distance between the wireless charging pad and the left parking space line. The distances may be determined in response to the image detection and made in reference to the vehicle longitudinal centerline or in reference to other known object dimensions within the image.

The method is then operative for generating 540 an augmented navigational image in response to the first image and the second image wherein the augmented navigational image further includes a right longitudinal guidance line indicative of the first distance between a vehicle longitudinal axis and the right parking space line and a left longitudinal guidance line indicative of the second distance between the vehicle longitudinal axis and the left parking space line such that when the vehicle longitudinal axis is aligned with the wireless charging pad, the right longitudinal guidance line is overlaid on the right parking space line and the left longitudinal guidance line is overlaid on the left parking space line, and The method is next operative to display 550 the augmented navigational image on a vehicle navigation display. The augmented navigational image may be a top down view showing a current overview of the wireless charger parking space, the current vehicle location and orientation and the painted parking space lines. The augmented navigational image may be further augmented with the right and left longitudinal guidance lines, wireless charging pad location, vehicle charging coupler location, etc.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. An apparatus for generating an augmented navigational image for aligning a vehicle to a wireless charging pad comprising:
    a camera operative for capturing a first image in a forward longitudinal direction and a second image;
    a processor operative for detecting the wireless charging pad, a right parking space line and a left parking space line in response to the first image, determining a first distance between the wireless charging pad and the right parking space line and a second distance between the wireless charging pad and the left parking space line, generating the augmented navigational image in response to the first image and the second image wherein the augmented navigational image further includes a right longitudinal guidance line spaced from a vehicle longitudinal axis proportional to the first distance between the vehicle longitudinal axis and the right parking space line and a left longitudinal guidance line spaced from a vehicle longitudinal axis proportional to the second distance between the vehicle longitudinal axis and the left parking space line such that when the vehicle longitudinal axis is aligned with the wireless charging pad, the right longitudinal guidance line overlaps on the right parking space line on the augmented navigational image and the left longitudinal guidance line overlaps the left parking space line on the augmented navigational image; and
    a display within a vehicle cabin operative for displaying the augmented navigational image.

2. The apparatus for generating the augmented navigational image for aligning the vehicle to the wireless charging pad of claim 1 wherein the augmented navigational image includes a top down view perspective.

3. The apparatus for generating the augmented navigational image for aligning the vehicle to the wireless charging pad of claim 1 wherein the display is operative to display the first image and the augmented navigational image.

4. The apparatus for generating the augmented navigational image for aligning the vehicle to the wireless charging pad of claim 1 wherein the augmented navigational image further includes a charging pad indicator indicative of the location of the wireless charging pad.

5. The apparatus for generating the augmented navigational image for aligning the vehicle to the wireless charging pad of claim 1 wherein the augmented navigational image further includes a charging pad indicator indicative of the location of the wireless charging pad and a charge coupler indicative of a location of a wireless charge coupler on the vehicle.

6. The apparatus for generating the augmented navigational image for aligning the vehicle to the wireless charging pad of claim 1 wherein the processor is operative for detecting the wireless charging pad in response to a vehicle speed being less than a threshold speed.

7. The apparatus for generating the augmented navigational image for aligning the vehicle to the wireless charging pad of claim 1 wherein the processor is operative for detecting the wireless charging pad in response to a vehicle location being proximate to a wireless charging station location.

8. The apparatus for generating the augmented navigational image for aligning the vehicle to the wireless charging pad of claim 1 wherein the processor is operative for detecting the wireless charging pad in response to a vehicle location being proximate to a wireless charging station location wherein the wireless charging station location is provided in response to a map data stored in a memory in the vehicle.

9. A method for generating an augmented navigational image for aligning a vehicle to a wireless charging pad comprising:
    capturing a first image in a forward longitudinal direction and a second image in a rearward longitudinal direction;
    detecting a wireless charging pad, a right parking space line and a left parking space line in response to the first image;

determining a first distance between the wireless charging pad and the right parking space line and a second distance between the wireless charging pad and the left parking space line;

generating an augmented navigational image in response to the first image and the second image wherein the augmented navigational image further includes a right longitudinal guidance line spaced from a vehicle longitudinal axis proportional to the first distance between a vehicle longitudinal axis and the right parking space line and a left longitudinal guidance line spaced from a vehicle longitudinal axis proportional to the second distance between the vehicle longitudinal axis and the left parking space line such that when the vehicle longitudinal axis is aligned with the wireless charging pad, the right longitudinal guidance line overlaps the right parking space line on the augmented navigational image and the left longitudinal guidance line overlaps the left parking space line on the augmented navigational image; and displaying the augmented navigational image on a vehicle navigation display.

10. The method for generating an augmented navigational image for aligning a vehicle to a wireless charging pad of claim 9 wherein the augmented navigational image includes a top down view perspective.

11. The method for generating an augmented navigational image for aligning a vehicle to a wireless charging pad of claim 9 wherein the display is operative to display the first image and the augmented navigational image.

12. The method for generating an augmented navigational image for aligning a vehicle to a wireless charging pad of claim 9 wherein the augmented navigational image further includes a charging pad indicator indicative of the location of the wireless charging pad.

13. The method for generating an augmented navigational image for aligning a vehicle to a wireless charging pad of claim 9 wherein the augmented navigational image further includes a charging pad indicator indicative of the location of the wireless charging pad and a charge coupler indicative of a location of a wireless charge coupler on the vehicle.

14. The method for generating an augmented navigational image for aligning a vehicle to a wireless charging pad of claim 9 further operative for detecting the wireless charging pad in response to a vehicle speed being less than a threshold speed.

15. The method for generating an augmented navigational image for aligning a vehicle to a wireless charging pad of claim 9 further operative for detecting the wireless charging pad in response to a vehicle location being proximate to a wireless charging station location wherein the wireless charging station location is provided in response to a map data stored in a memory in the vehicle.

16. An apparatus comprising:
a display for displaying a first augmented image and a second augmented image;
a first camera operative to capture a first image of a first field of view;
a second camera operative to capture a second image of a second field of view;
a processor operative for detecting a wireless charging pad, a right parking space line and a left parking space line in response to the first image, determining a first distance between the wireless charging pad and the right parking space line and a second distance between the wireless charging pad and the left parking space line, for generating an augmented navigational image in response to the first image and the second image wherein the augmented navigational image further includes a right longitudinal guidance line spaced from a vehicle longitudinal axis proportional to the first distance between a vehicle longitudinal axis and the right parking space line and a left longitudinal guidance line spaced from a vehicle longitudinal axis proportional to the second distance between the vehicle longitudinal axis and the left parking space line such that when the vehicle longitudinal axis is aligned with the wireless charging pad, the right longitudinal guidance line overlaps the right parking space line on the augmented navigational image and the left longitudinal guidance line overlaps the left parking space line on the augmented navigational image; and
a display operative to displaying the augmented navigational image.

17. The apparatus of claim 16 wherein the augmented navigational image is a top down view image.

18. The apparatus of claim 16 wherein the processor is further operative to generate an augmented front view image in response to the first image wherein the augmented front view image includes the left longitudinal guidance line and the right longitudinal guidance line rendered from a front view perspective.

19. The apparatus of claim 18 wherein the display is further operative to display the augmented front view image.

20. The apparatus of claim 16 wherein the processor is further operative for detecting the wireless charging pad in response to a vehicle location being proximate to a wireless charging station location and wherein the wireless charging station location is provided in response to a map data received via a wireless transmission.

* * * * *